(12) United States Patent
Sekimoto et al.

(10) Patent No.: US 8,098,035 B2
(45) Date of Patent: Jan. 17, 2012

(54) MOTOR CONTROL UNIT (75) Inventors: Morimitsu Sekimoto, Kusatsu (JP); Hitoshi Haga, Sendai (JP); Abdallah Mechi, Kusatsu (JP); Reiji Kawashima, Kusatsu (JP); Kenichi Sakakibara, Kusatsu (JP); Toshiyuki Maeda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 344 days.

(21) Appl. No.: 12/439,496

(22) PCT Filed: Aug. 29, 2007

(86) PCT No.: PCT/JP2007/066778
§ 371 (c)(1),
(2), (4) Date: Feb. 27, 2009

(87) PCT Pub. No.: WO2008/026643
PCT Pub. Date: Mar. 6, 2008

(65) Prior Publication Data
US 2009/0251086 A1 Oct. 8, 2009

(30) Foreign Application Priority Data
Aug. 31, 2006 (JP) .................................. 2006-236354

(51) Int. Cl.
*H02P 7/00* (2006.01)
(52) U.S. Cl. .................. 318/432; 318/434; 318/400.15; 318/400.23; 318/807
(58) Field of Classification Search .................. 318/432, 318/434, 400.15, 400.23, 807
See application file for complete search history.

(56) References Cited

U.S. PATENT DOCUMENTS

| 4,736,143 A * | 4/1988 | Nakamura et al. ............ 318/432 |
| 2005/0012490 A1 | 1/2005 | Ueda et al. |
| 2006/0179859 A1 | 8/2006 | Nakata et al. |

FOREIGN PATENT DOCUMENTS

| JP | 2-17884 A | 1/1990 |
| JP | 2000-209886 A | 7/2000 |
| JP | 2001-268967 A | 9/2001 |
| JP | 2002-51589 A | 2/2002 |
| JP | 2003-339197 A | 11/2003 |
| JP | 2004-236469 A | 8/2004 |
| JP | 2004-343993 A | 12/2004 |
| JP | 2005-57989 A | 3/2005 |
| JP | 2005-204404 A | 7/2005 |
| JP | 3766348 B2 | 2/2006 |

OTHER PUBLICATIONS

Shovlin, Joseph; Woodin, Richard; Witt, Tony; 2004 IEEE/Advanced Semiconductor Manufacturing Conference, "Silicon Carbide in a Silicon World: Introducing Wide Band Gap Semiconductor Production into a Silicon Fab", pp. 420-424.*

* cited by examiner

*Primary Examiner* — Walter Benson
*Assistant Examiner* — Erick Glass
(74) *Attorney, Agent, or Firm* — Birch, Stewart, Kolasch & Birch, LLP (57) ABSTRACT

A motor control unit (10) includes: a power converter (40) having a rectifier circuit (20) which rectifies an AC voltage from an AC power supply (31), a capacitor circuit (22) which receives an output of the rectifier circuit (20) and outputs a rectified voltage having pulses from both ends of a capacitor (13) and an inverter circuit (25) which receives the rectified voltage and outputs an AC voltage to the motor (30); and a motor controller (41) controlling the motor (30) by controlling the inverter circuit (25). The motor controller (41) performs torque control to vary an output toque of the motor (30) in response to variation in load torque of the motor (30).

7 Claims, 7 Drawing Sheets

MOTOR CONTROL UNIT

TECHNICAL FIELD

The present invention relates to motor control units for motors of compressors including a rectifier circuit, a capacitor circuit and an inverter circuit.

BACKGROUND ART

In conventionally known motor control units for controlling motors of compressors, an AC voltage from an AC power supply is rectified by a rectifier circuit to become a rectified voltage having rectified pulses, and the rectified voltage is hardly smoothed and input to an inverter circuit. An example of such motor control units is disclosed by Patent Literature 1.

Figure 7:
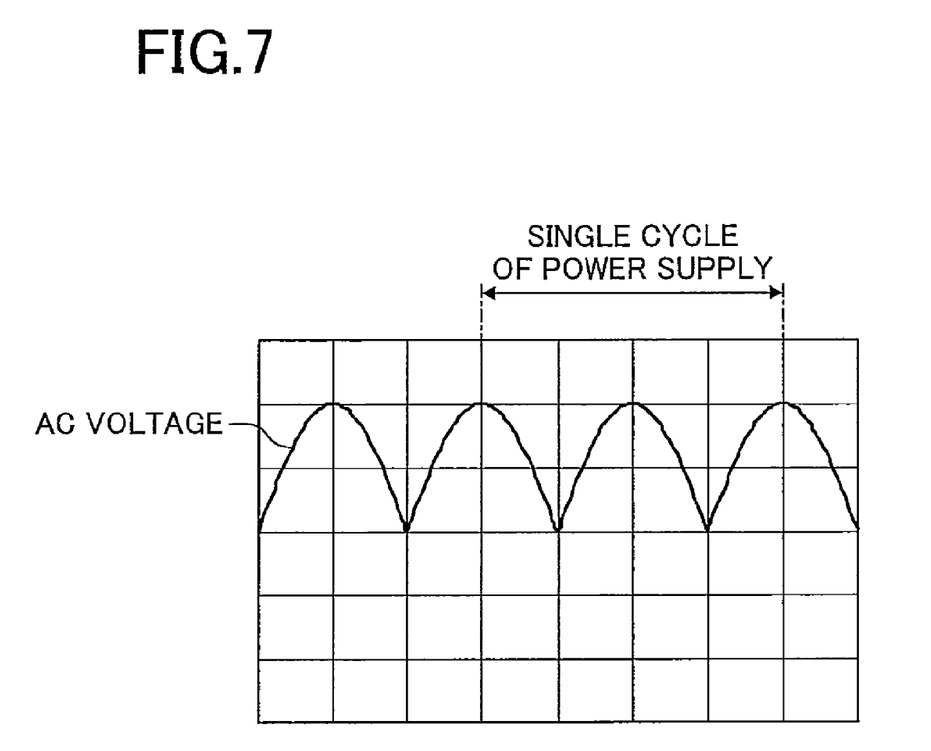
FIG. 7 is a diagram illustrating a waveform of a pulse current input to an inverter.

Specifically, the motor control unit of Patent Literature 1 includes a single-phase diode full-wave rectifier circuit, a low-capacity smoothing capacitor and a PWM control inverter. The low-capacity smoothing capacitor is a capacitor having a capacity of about $1/100$ of that of a smoothing capacitor of a conventional motor control unit. Therefore, in practical, the motor control unit of Patent Literature 1 does not have a capacitor for keeping the voltage constant. A fall-wave-rectified voltage rectified by the single-phase diode full-wave rectifier circuit is hardly smoothed and input to the PWM control inverter in the waveform as shown in FIG. 7. The PWM control inverter receives the rectified voltage and outputs a polyphase AC current to the motor. The motor control unit of this kind allows reduction in size and cost as the capacity of the capacitor is low.

As disclosed by Patent Literature 2, another known motor control unit performs torque control to vary an output torque in response to variation in load torque that occurs in a single rotation of the motor of the compressor. In the case of a rotary compressor, for example, a load torque of the motor periodically varies in the course of fluid compression including a set of suction, compression and discharge processes. Therefore, if an output torque of the motor is constant, the rotation speed of the compressor varies and the compressor vibrates. The torque control is performed to reduce the vibration of the compressor.

Patent Literature 1: Published Japanese Patent Application No. 2002-51589
Patent Literature 2: Published Japanese Patent Application No. 02-17884

DISCLOSURE OF THE INVENTION

Problem that the Invention is to Solve

So far, the conventional motor control units in which a voltage rectified by a rectifier circuit and having rectified pulses is hardly smoothed and input to an inverter circuit have not been able to perform the torque control. Therefore, when the motor control unit of this kind is used to control the motor of the compressor, it has been impossible to reduce the vibration of the compressor.

In view of the foregoing, the present invention has been achieved. In relation to a motor control unit for a motor of a compressor in which a voltage rectified by a rectifier circuit and having rectified pulses is input to an inverter circuit, an object of the invention is to reduce the vibration of the compressor.

Means of Solving the Problem

A first aspect of the invention is directed to a motor control unit (10) for controlling a motor (30) of a compressor in which a load torque varies in a single rotation in the course of fluid compression by the compressor. The motor control unit (10) includes: a power converter (40) having a rectifier circuit (20) which rectifies an AC voltage from an AC power supply (31), a capacitor circuit (22) which receives an output of the rectifier circuit (20) and outputs a rectified voltage having pulses from both ends of a capacitor (13) and an inverter circuit (25) which receives the rectified voltage and outputs an AC voltage to the motor (30); and a motor controller (41) controlling the motor (30) by controlling the inverter circuit (25), wherein the motor controller (41) performs torque control to vary an output toque of the motor (30) in response to variation in load torque of the motor (30).

According to a second aspect of the invention in relation to the first aspect, the motor control unit further includes a current detector (43) detecting a current value of the motor (30), wherein the motor controller (41) adjusts a torque control level in the torque control so that a current value of the motor (30) detected by the current collector (43) does not exceed an upper limit value based on a peak rated current of a switching element (14) of the inverter circuit (25) or an upper limit value based on characteristics of the motor (30).

According to a third aspect of the invention in relation to the first or second aspect, in the torque control, the motor controller (41) adjusts a phase of the motor (30) relative to a phase of the AC power supply (31) so that a peak current value of the motor (30) is reduced.

According to a fourth aspect of the invention in relation to any one of the first to third aspects, in the torque control, the motor controller (41) prohibits the motor (30) from continuously rotating at a rotation speed within a range in which the motor (30) produces a beat note.

According to a fifth aspect of the invention in relation to any one of the first to fourth aspects, the switching element (14) of the inverter circuit (25) is a wide-band-gap semiconductor element.

According to a sixth aspect of the invention in relation to the fifth aspect, the switching element (14) of the inverter circuit (25) is a SiC element.

—Function—

According to the first aspect of the invention, the motor controller (41) performs the torque control. In the torque control, the motor controller (41) controls the inverter circuit (25) in response to variation in load torque of the motor (30) so that an output torque of the motor (30) is varied.

According to the second aspect of the invention, the motor controller (41) adjusts the torque control level in the torque control. When the torque control is performed, a pulse component derived from a frequency of the AC power supply (31) and a pulse component derived from the variation in load torque that occurs in the single rotation of the motor (30) are superimposed. Therefore, a peak current value of the motor (30) is increased as compared with the case where the torque control is not performed. The higher the torque control level is, the more the peak current value of the motor (30) is increased. According to the second aspect of the invention, the motor controller (41) adjusts the torque control level in the torque control so that the current value of the motor (30) does not exceed the upper limit value. Therefore, the current value of the switching element (14) of the inverter circuit (25) does not also exceed the upper limit value.

Figure 5A:
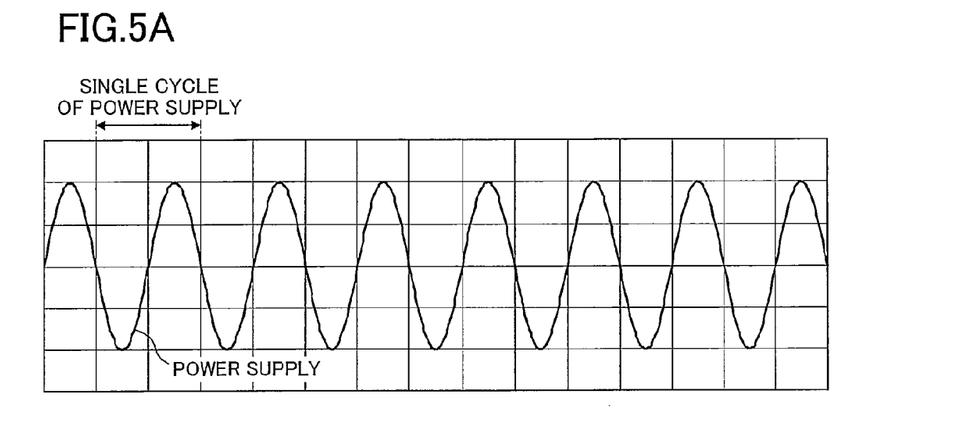
Figure 5B:
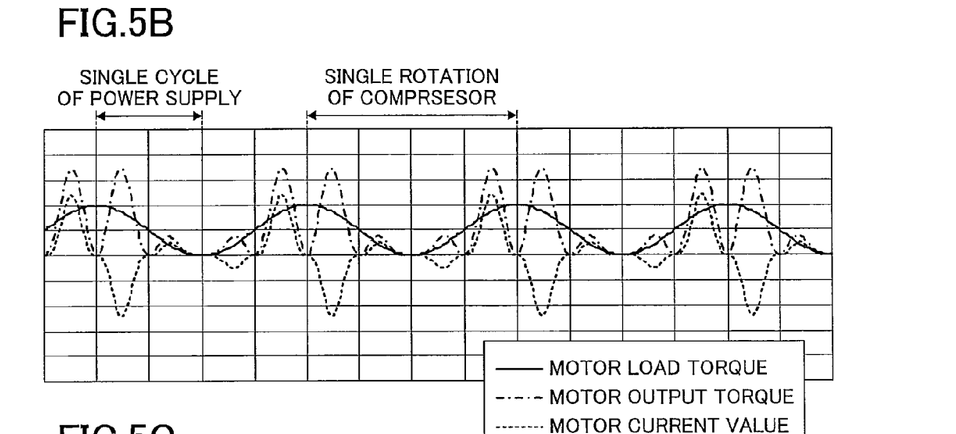
Figure 5C:
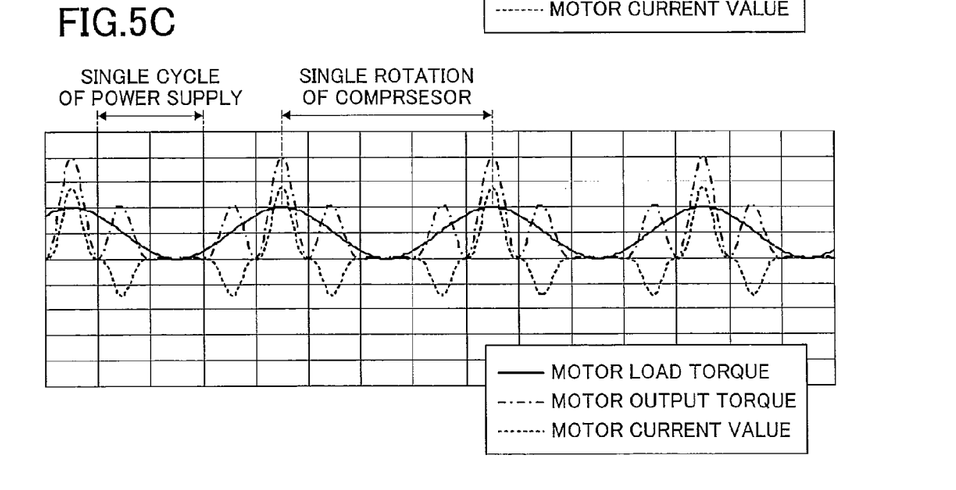

According to the third aspect of the invention, the motor controller (41) adjusts the phase of the motor (30) relative to the phase of the AC power supply (31). As shown in FIG. 5, when the phase of the motor (30) relative to the phase of the AC power supply (31) is varied, the peak current value also varies. The motor controller (41) stores in advance, for example, a phase of the motor (30) corresponding to a phase of the AC power supply (31) at which the peak current value of the motor (30) is minimized. Then, in the torque control, the phase of the motor (30) is adjusted relative to the phase of the AC power supply (31) so that the peak current value of the motor (30) is reduced. In this way, the peak current value of the switching element (14) of the inverter circuit (25) is also reduced.

According to the fourth aspect of the invention, in the torque control, the motor controller (41) prohibits the motor (30) from continuously rotating at a rotation speed within a range in which the motor (30) produces a beat note. Specifically, even if the rotation speed of the motor (30) temporarily falls within the range in which the motor (30) produces the beat note, the rotation speed is not kept in the range. Therefore, the motor (30) is less likely to produce the beat note during the torque control.

According to the fifth aspect of the invention, the switching element is a wide-band-gap semiconductor element. The wide-band-gap semiconductor element has a larger bandgap and higher heat resistance than those of a generally used Si element. Therefore, the wide-band-gap semiconductor element is able to increase the peak rated current to a greater extent than the Si element given that their current capacities are the same.

According to the sixth aspect of the invention, the switching element (14) is a SiC element. The SiC element is one of the wide-band-gap semiconductor elements and capable of increasing the peak rated current to a greater extent than the generally used Si element given that their capacities are the same.

Effect of the Invention

Figure 2:
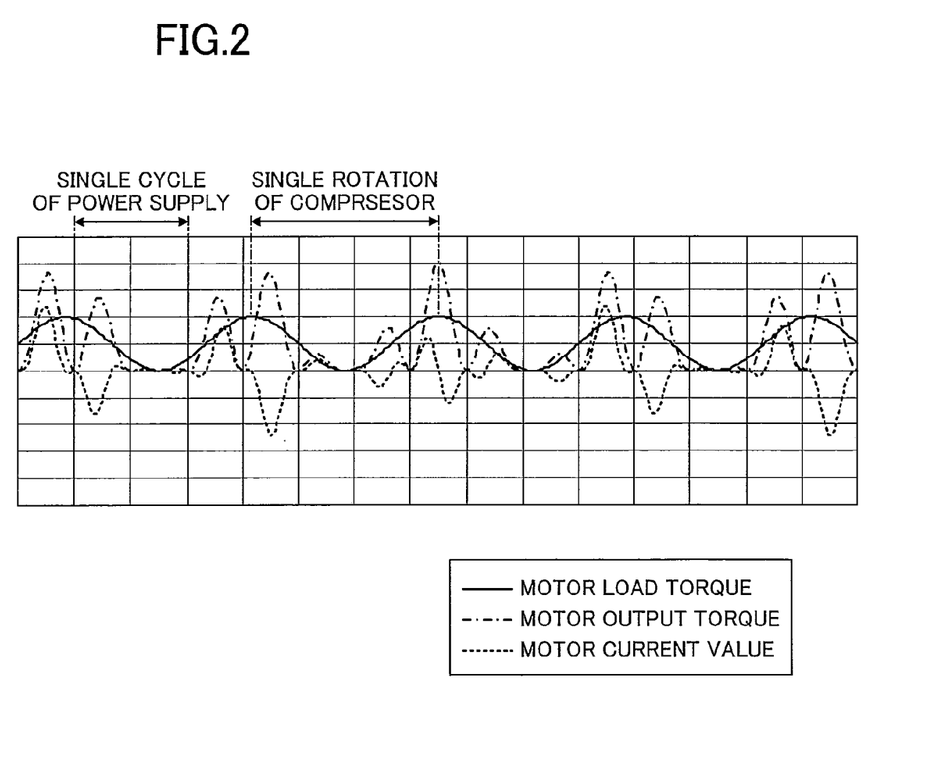
FIG. 2 is a diagram illustrating variations in load torque, output torque and current value of a motor when torque control is performed in the motor control unit according to the embodiment of the present invention.

According to the present invention, the motor controller (41) performs the torque control to vary the output toque of the motor (30) in response to variation in load torque of the motor (30) that occurs in a single rotation of the motor (30). When the torque control is performed in the motor control unit (10) in which a voltage rectified by the rectifier circuit (20) is hardly smoothed and input to the inverter circuit (25), a pulse component derived from a frequency of the AC power supply (31) and a pulse component derived from the variation in load torque that occur in the single rotation of the motor (30) are superimposed. As a result, the output torque of the motor (30) and the current value of the motor (30) show waveforms including beats as shown in FIG. 2. A frequency analysis of the beat-including waveforms indicates that the pulse component derived from the frequency of the AC power supply (31) appears frequently, while the pulse component derived from the variation in load torque is reduced. The frequent one of the pulse components is a 100 Hz pulse component, for example when the AC power supply (31) is 50 Hz. Due to the inertia effect of the motor (30), the pulse component as high as about 100 Hz would not greatly affect the rotation speed of the motor (30). Therefore, by the torque control performed in the motor control unit (10) in which the voltage rectified by the rectifier circuit (20) is hardly smoothed and input to the inverter circuit (25), the vibration of the compressor can be reduced.

According to the second aspect of the invention, the motor controller (41) adjusts the torque control level in the torque control so that the current value of the switching element (14) of the inverter circuit (25) does not exceed the upper limit value based on the peak rated current or the upper limit value based on the characteristics of the motor (30). Since the current value of the switching element (14) of the inverter circuit (25) does not exceed the peak rated current, damage to the switching element (14) can be prevented and the motor control unit (10) can be improved in reliability.

According to the third aspect of the invention, in the torque control, the motor controller (41) adjusts the phase of the motor (30) relative to the phase of the AC power supply (31) so that the peak current value of the switching element (14) of the inverter circuit (25) is reduced. This makes it possible to reduce the risk of causing damage to the switching element (14) of the inverter circuit (25), and therefore the reliability of the motor control unit (10) can be improved. Further, as mentioned in connection with the second aspect of the invention, when the torque control level is adjusted so that the current value of the motor (30) is less than a certain upper limit value, an upper limit value of the adjustable torque control level can be increased.

According to the fourth aspect of the invention, in the torque control, the motor controller (41) prohibits the motor (30) from continuously rotating at a rotation speed within a range in which the motor (30) produces a beat note. Therefore, the motor (30) is less likely to produce the beat note. This makes it possible to improve quietness of the compressor whose vibration is reduced by the torque control.

According to the fifth aspect of the invention, the switching element is a wide-band-gap semiconductor element capable of increasing the peak rated current to a greater extent as compared with a conventionally used Si element given that their capacities are the same. Therefore, the peak current value of the switching element (14) is less likely to exceed the peak rated value in the torque control and the reliability of the motor control unit (10) is improved.

According to the sixth aspect of the invention, the switching element (14) is a SiC element capable of increasing the peak rated current to a greater extent as compared with the conventionally used Si element given that their capacities are the same. Therefore, the peak current value of the switching element (14) is less likely to exceed the peak rated current in the torque control and the reliability of the motor control unit (10) can be improved.

BRIEF DESCRIPTION OF DRAWINGS

FIGS. 3(A) to 3(C) are diagrams illustrating variations in load torque, output torque and current value of the motor when the torque control is performed, in the motor control unit according to the embodiment of the present invention, in which FIG. 3(A) shows the variations in response to a torque control level of 100%, FIG. 3(B) shows the variations in response to the torque control level of 50% and FIG. 3(C) shows the variations in response to the torque control level of 0%.

FIGS. 5(A) to 5(C) are diagrams illustrating how to adjust a phase of a motor relative to a phase of an AC power supply when the torque control is performed in the motor control unit according to Modified Embodiment 1, in which FIG. 5(A) shows the phase of the AC power supply, FIG. 5(B) shows variations in load torque, output torque and current value of the motor before the motor phase adjustment and FIG. 5(C) shows variations in load torque, output torque and current value of the motor after the motor phase adjustment.

EXPLANATION OF REFERENCE NUMERALS

10 Motor control unit
14 Switching element
20 Rectifier circuit
25 Inverter circuit
30 Motor
31 AC power supply
40 Power converter
41 Motor controller
43 Current detector

BEST MODE FOR CARRYING OUT THE INVENTION

Figure 1:
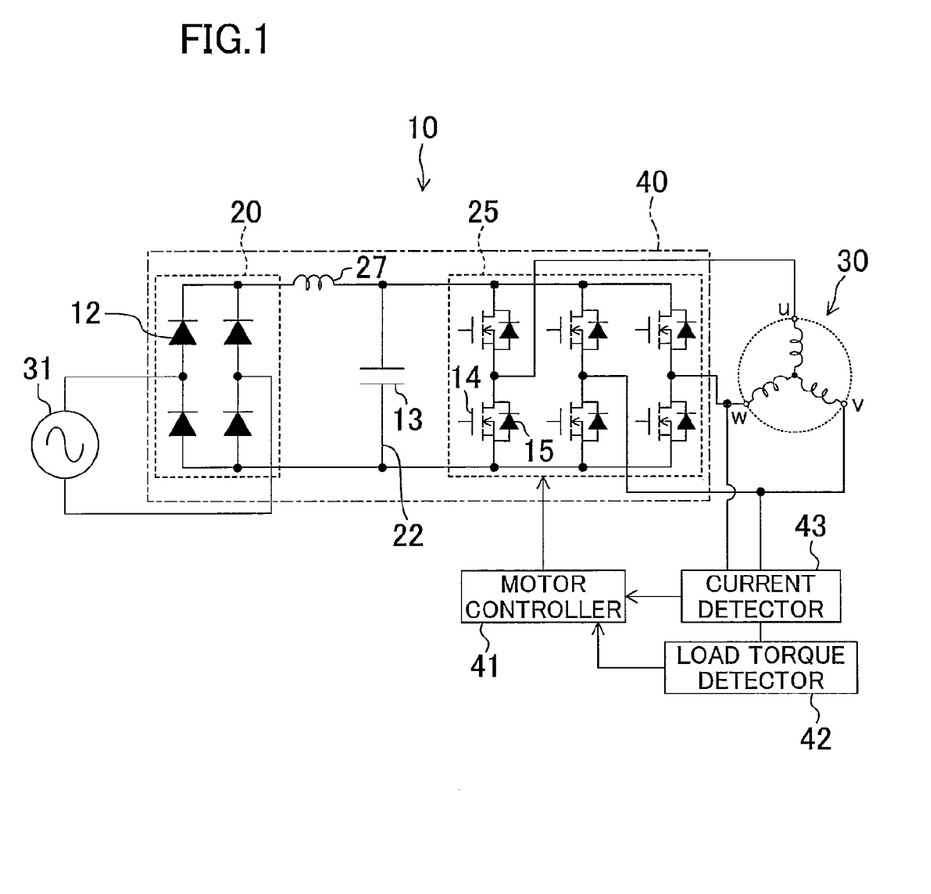
FIG. 1 is a schematic view illustrating the structure of a motor control unit according to an embodiment of the present invention.

Hereinafter, the present invention is described in detail by way of embodiments with reference to the drawings.
—Structure of Motor Control Unit—
A motor control unit (10) according to the present embodiment is connected to, for example, a brushless DC motor (30) of a single-cylinder rotary compressor connected to a refrigerant circuit of an air conditioner. As shown in FIG. 1, the motor control unit (10) includes a power converter (40), a motor controller (41), a current detector (43) and a load torque detector (42). The power converter (40) includes a rectifier circuit (20), a capacitor circuit (22) and an inverter circuit (25). Compressors other than the rotary compressor, e.g., multiple-cylinder compressors, may be used. Motors other than the brushless DC motor may be used.

The rectifier circuit (20) rectifies an AC voltage from an AC power supply (31). The rectifier circuit (20) is made of four diodes (12) connected in the form of a bridge. An input end of the rectifier circuit (20) is connected to the AC power supply (31). A reactor (27) is provided on a positive electrode bus between the rectifier circuit (20) and the capacitor circuit (22).

The capacitor circuit (22) is connected between the positive electrode bus and a negative electrode bus at an output end of the rectifier circuit (20). The capacitor circuit (22) is provided with a capacitor (13) whose capacity is lower than that of a capacitor used in a conventional motor control unit. The capacity of the capacitor (13) is, for example, 1 µF to 50 µF. The capacitor circuit (22) receives an output of the rectifier circuit (20) and outputs from both ends of the capacitor (13) a rectified voltage having pulses twice as large as those of an AC voltage from the AC power supply (31).

The inverter circuit (25) supplies a polyphase AC current (a three-phase AC current in the present embodiment) to the motor (30). In the inverter circuit (25), three circuits each including two switching elements (14) connected in series are connected in parallel between the positive and negative electrode buses. Between the two switching elements (14) of the three circuits, terminals of a three-phase coil (uvw) of the motor (30) are connected, respectively. A diode (15) is connected in parallel to each of the switching elements (14). The switching elements (14) may be, for example, power MOSFETs or IGBTs. The switching elements (14) are Si elements.

The current detector (43) detects a current value of the motor (30). The current collector (43) is connected to at least two of three wires between the three-phase coil (uvw) and the inverter circuit (25) so that the current value detection can be carried out at all times.

The load torque detector (42) detects a load torque of the motor (30). The load torque detector (42) is configured to detect the load torque of the motor (30) based on the current value detected by the current collector (43).

The motor controller (41) outputs a drive signal to the switching elements (14) of the inverter circuit (25) to turn the switching elements (14) ON/OFF. The motor controller (41) controls the ON/OFF state of the switching elements (14) to adjust the rotation speed and the output torque of the motor (30). For example, when the motor (30) is running at a low speed, the motor controller (41) performs torque control to vary the output torque in response to variation in load torque of the motor (30). According to the torque control, the motor controller (41) adjusts variation in voltage command and current command of the drive signal in response to the variation in load torque of the motor (30). In this way, an ON period of the switching elements (14) in a carrier frequency is adjusted.

—Operation of Motor Control Unit—
The torque control by the motor controller (41) of the motor control unit (10) is explained below. In the torque control, a load torque signal representing the load torque of the motor (30) detected by the load torque detector (42) and a motor current signal representing the current value of the motor (30) detected by the current collector (43) are input to the motor controller (41).

First, the motor controller (41) adjusts the variation in voltage command and current command of the drive signal based on the load torque signal from the load torque detector (42) so that the output torque of the motor (30) varies in response to the variation in load torque of the motor (30). The motor controller (41) outputs a drive signal in which the variation in voltage command and the current command have been adjusted to the switching elements (14) to turn the switching elements (14) ON/OFF. As a result, the output torque of the motor (30) varies in synchronization with the variation in load torque of the motor (30) as shown in FIG. 2. As a result of the adjustment of the variation in voltage command and current command by the motor controller (41), the ON period of the switching elements (14) in a carrier frequency is adjusted.

In the motor controller (41), a value based on a peak rated current of the switching element (14) is defined as an upper limit value of the current of the motor (30). The upper limit value is slightly lower than the peak rated current value of the switching element (14). In the torque control, the motor controller (41) adjusts a torque control level, which is the degree of variation in output torque of the motor (30), so that the current value of the motor (30) does not exceed the upper limit value.

Figure 3A:
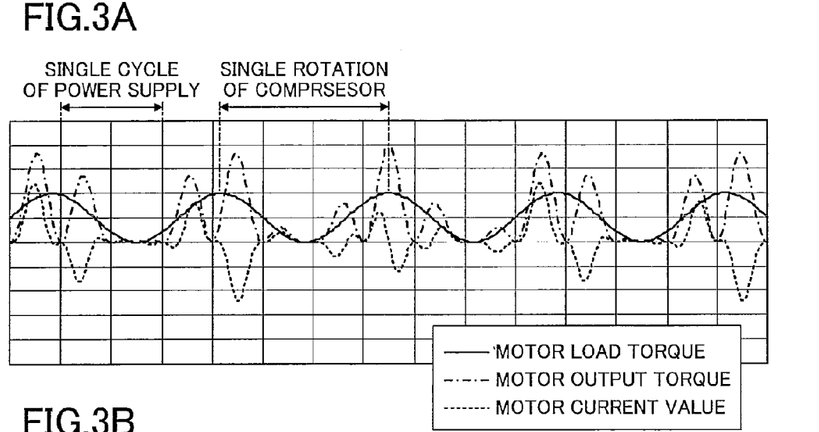
Figure 3B:
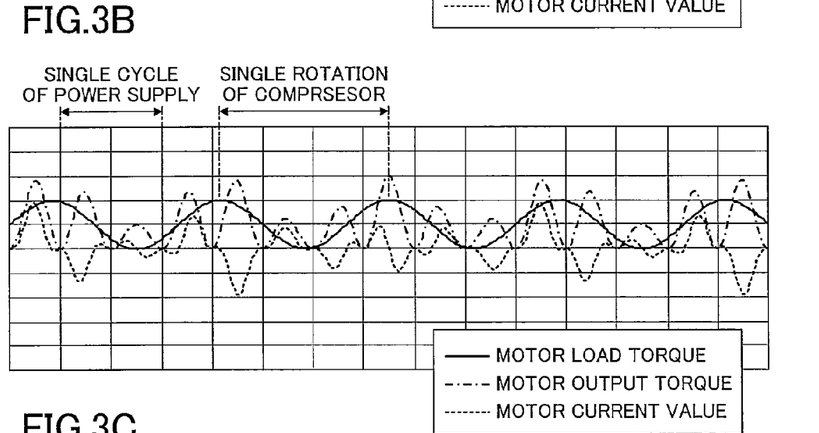
Figure 3C:
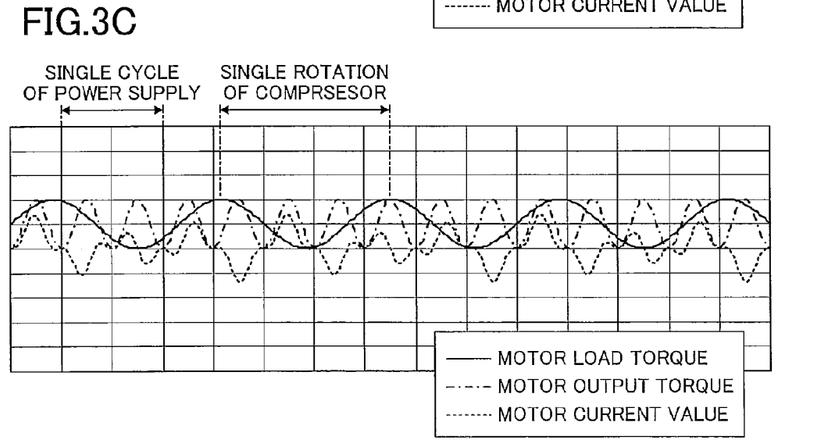

Specifically, in order to adjust the torque control level, the motor controller (41) adjusts the variation in voltage command and current command of a drive signal based on the motor current signal from the current collector (43) and outputs the drive signal. As the variation in voltage command and current command is adjusted, the ON period in a carrier frequency is adjusted, and then the torque control level is adjusted. FIG. 3 shows the variation in output torque of the motor (30) and the variation in current value of the motor (30) in response to different torque control levels. When the motor controller (41) performs the torque control at a torque control level of 50%, the vibration of the compressor is reduced to half as compared with the case where the torque control is not performed. The upper limit value may be specified as a value based on the characteristics of the motor (30).

Advantage of Embodiment

According to the present embodiment, the motor controller (41) performs the torque control to vary the output torque of the motor (30) in response to the variation in load torque that occurs in a single rotation of the motor (30). When the torque control is performed in the motor control unit (10) in which a voltage rectified by the rectifier circuit (20) is hardly smoothed and input to the inverter circuit (25), a pulse component twice as large as the frequency of the AC power supply (31) and a pulse component of the variation in load torque that occurs in the single rotation of the motor (30) are superimposed. As a result, the output torque of the motor (30) and the current of the motor (30) show waveforms including beats as shown in FIG. 2. A frequency analysis of the beat-including waveforms indicates that the pulse component twice as large as the frequency of the AC power supply (31) appears frequently, while the pulse component of the variation in load torque is reduced. The frequent one of the pulse components is a 100 Hz pulse component, for example when the AC power supply (31) is 50 Hz. Due to the inertia effect of the motor (30), the pulse component as high as about 100 Hz would not greatly affect the rotation speed of the motor (30). Therefore, by the torque control performed in the motor control unit (10) in which the voltage rectified by the rectifier circuit (20) is hardly smoothed and input to the inverter circuit (25), the vibration of the compressor can be reduced.

According to the present embodiment, the motor controller (41) adjust the torque control level in the torque control so that the current value of the switching element (14) of the inverter circuit (25) does not exceed the upper limit value based on the peak rated current. Since the current value of the switching element (14) of the inverter circuit (25) does not exceed the peak rated current, damage to the switching element (14) can be prevented and the motor control unit (10) can be improved in reliability.

Modified Embodiment 1

Figure 4:
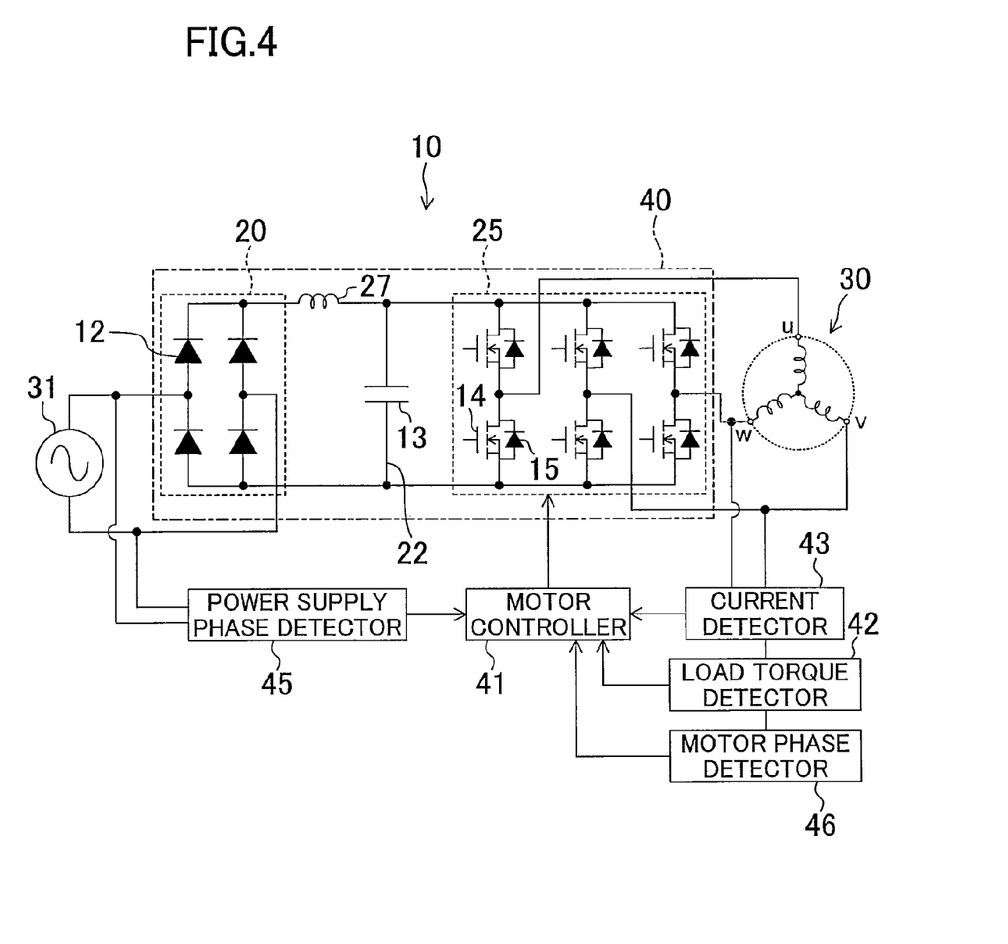
FIG. 4 is a schematic view illustrating the structure of a motor control unit according to Modified Embodiment 1 of the present invention.

Modified Embodiment 1 is explained below. According to Modified Embodiment 1, as shown in FIG. 4, the motor control unit (10) includes a power supply phase detector (45) and a motor phase detector (46).

Specifically, the power supply phase detector (45) is configured to detect the phase of the AC power supply (31). The motor phase detector (46) is configured to detect the phase of the motor (30) based on the current value of the motor (30). The motor phase detector (46) may be configured to detect the phase of the motor (30) based on the voltage value of the motor (30) or may comprise a phase detection sensor attached to the motor (30).

In the motor control unit (10), in the torque control, a power supply phase signal representing the phase of the AC power supply (31) detected by the power supply phase detector (45) and a motor phase signal representing the phase of the motor (30) detected by the motor phase detector (46) are input to the motor controller (41). Further, the motor controller (41) stores in advance the phase of the motor (30) corresponding to the phase of the AC power supply (31) at which the peak current value of the motor (30) is minimized. For example, the motor controller (41) stores the state in which the motor (30) takes the phase shown in FIG. 5(B) relative to the phase of the AC power supply (31) shown in FIG. 5(A) as the state in which the peak current value of the motor (30) is minimized.

The motor controller (41) comprehends the phase of the motor (30) corresponding to the present phase of the AC power supply (31) based on the power supply phase signal and the motor phase signal. Then, the motor controller (41) increases or decreases the frequency of the motor (30) to adjust the phase of the motor (30) so that it corresponds to the previously stored phase of the AC power supply (31). For example, when the motor controller (41) recognizes that the present phase of the motor (30) relative to the phase of the AC power supply (31) is in the state shown in FIG. 5(C), it temporarily increases the frequency of the motor (30) to adjust the phase of the motor (30) relative to the phase of the AC power supply (31) to the state shown in FIG. 5(B).

When the motor controller (41) performs the torque control, and the rotation cycle of the motor (30) is not the integral multiple of a half cycle of the AC power supply (31), the frequency of the motor (30) is adjusted so that the rotation cycle of the motor (30) becomes the integral multiple of the half cycle of the AC power supply (31).

According to Modified Embodiment 1, in the torque control, the motor controller (41) adjusts the phase of the motor (30) relative to the phase of the AC power supply (31) so that the peak current value of the motor (30) is reduced. Accordingly, the current peak value of the switching element (14) of the inverter circuit (25) is reduced. This makes it possible to reduce the risk of causing damage to the switching element (14) of the inverter circuit (25), and therefore the reliability of the motor control unit (10) can be improved. As described in Embodiment 1, when the torque control level is adjusted so that the current value of the motor (30) is less than a certain upper limit value, an upper limit value of the adjustable torque control level can be increased. As a result, the vibration of the compressor can be reduced.

Modified Embodiment 2

Figure 6:
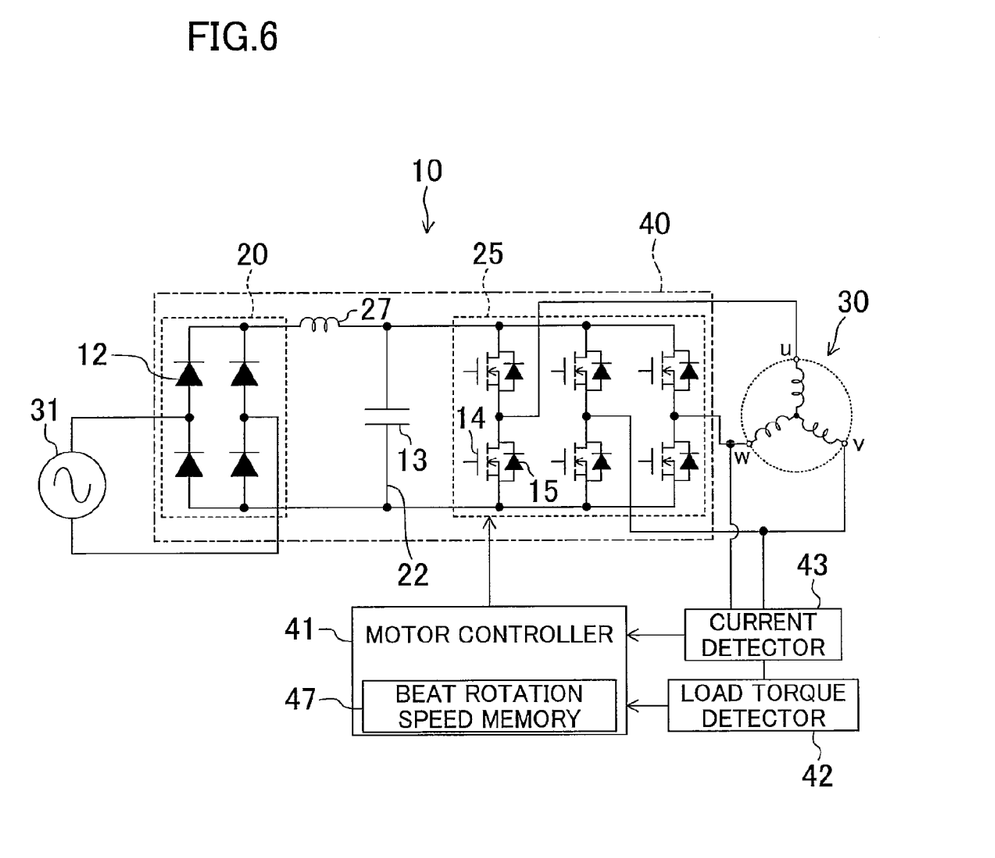
FIG. 6 is a schematic view illustrating a motor control unit according to Modified Embodiment 2 of the present invention.

Modified Embodiment 2 of the embodiment is explained below. According to Modified Embodiment 2, the motor controller (41) includes a beat rotation speed memory (47) as shown in FIG. 6. The beat rotation speed memory (47) stores a range of rotation speed of the motor (30) in which the motor (30) produces a beat note as a beat region. The beat region is determined by experiments performed in designing the unit and stored in the beat rotation speed memory (47).

According to the motor control unit (10), in the torque control, the motor controller (41) prohibits the motor (30) from continuously rotating at a rotation speed within a range in which the motor (30) produces the beat note. Specifically, the motor controller (41) controls the rotation speed of the motor (30) so that the motor (30) does not continuously rotate at a rotation speed within the range in which the motor (30) produces the beat note. For example, when the rotation speed of the motor (30) is adjusted from a value smaller than the beat-producing range to a value larger than the beat-producing range, the rotation speed of the motor (30) temporarily passes through the beat-producing range. However, due to the operation of the motor controller (41), the rotation speed of the motor (30) is prevented from remaining in the beat-producing range.

According to Modified Embodiment 2, the motor (30) is less likely to produce the beat note. This makes it possible to improve quietness of the compressor whose vibration is reduced by the torque control.

Other Embodiments

The above-described embodiment may be varied in the following manner.

The switching element (14) of the embodiment may be, for example, a wide-band-gap semiconductor element such as a SiC element, a GaN element and a diamond element. As compared with a Si element, the wide-band-gap semiconductor element has a larger bandgap and higher heat resistance, and therefore is able to increase the peak rated current to a greater extent given that their current capacities are the same. The wide-band-gap semiconductor element preferably has a bandgap of not less than 1.2 eV, more preferably not less than 2.0 eV.

The description of the preferred embodiment is provided only for explanation purpose and does not limit the present invention, an object to which the present invention is applied and use of the invention.

INDUSTRIAL APPLICABILITY

As described above, the present invention is useful for motor control units for controlling motors of compressors including a rectifier circuit and an inverter circuit.

The invention claimed is:

1. A motor control unit for controlling a motor of a compressor in which a load torque varies in a single rotation in the course of fluid compression by the compressor, the motor control unit comprising:

a power converter having a rectifier circuit which rectifies an AC voltage from an AC power supply, a capacitor circuit which receives an output of the rectifier circuit and outputs a rectified voltage having a waveform of a full-wave rectified AC power supply from both ends of a capacitor and an inverter circuit which receives the rectified voltage and outputs an AC voltage to the motor; and a motor controller controlling the motor by controlling the inverter circuit, wherein the motor controller performs torque control to vary an output torque of the motor in response to variation in load torque of the motor by superimposing a pulse component of the variation in load torque of the motor and a pulse component of the rectified voltage on an output torque of the motor.

2. The motor control unit of claim 1, wherein the motor controller performs the torque control so that a line having a waveform formed by connecting respective peak values of waves in a waveform of the output torque of the motor together in chronological order has a ripple shape according to a waveform of the pulse component of the variation in load torque of the motor.

3. The motor control unit of claim 1 or 2, further comprising:

a current detector detecting a current value of the motor, wherein the motor controller adjusts a torque control level in the torque control so that a current value of the motor detected by the current collector does not exceed an upper limit value based on a peak rated current of a switching element of the inverter circuit or an upper limit value based on characteristics of the motor.

4. The motor control unit of claim 1 or 2, wherein in the torque control, the motor controller adjusts a phase of the motor relative to a phase of the AC power supply so that a peak current value of the motor is reduced.

5. The motor control unit of claim 1 or 2, wherein in the torque control, the motor controller prohibits the motor from continuously rotating at a rotation speed within a range in which the motor produces a beat note.

6. The motor control unit of claim 1 or claim 2, wherein the switching element of the inverter circuit is a wide-band-gap semiconductor element.

7. The motor control unit of claim 1 or 2, wherein the switching element of the inverter circuit is a SiC element.

* * * * *